United States Patent
Nakashima et al.

(12) 
(10) Patent No.: US 6,354,112 B2
(45) Date of Patent: Mar. 12, 2002

(54) METHOD OF DEPOSITING GLASS SOOT WITH CONTROLLING REACTION CHAMBER HUMIDITY TO PREVENT ACCUMULATION OF EXCESS SOOT

(75) Inventors: Yasuhiro Nakashima; Tadakatsu Shimada; Hideo Hirasawa, all of Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/204,125

(22) Filed: Dec. 2, 1998

(30) Foreign Application Priority Data

Dec. 3, 1997 (JP) ............................... 9-348530

(51) Int. Cl.⁷ ........................................ C03B 37/018
(52) U.S. Cl. .............................. 65/414; 65/426; 65/532
(58) Field of Search ......................... 65/414, 426, 530, 65/531, 536

(56) References Cited

U.S. PATENT DOCUMENTS

| | | | |
|---|---|---|---|
| 4,419,116 A | * 12/1983 | Nakahara | |
| 4,421,540 A | * 12/1983 | Nakahara | 65/414 |
| 4,428,762 A | * 1/1984 | Andrejco | 65/414 |
| 4,707,173 A | * 11/1987 | Kawazoe | 65/414 |
| 4,740,226 A | * 4/1988 | Toda | 65/414 |
| 5,194,714 A | * 3/1993 | LeSergent | |
| 6,012,305 A | * 1/2000 | Kuwabara | 65/414 |

FOREIGN PATENT DOCUMENTS

| | | | | |
|---|---|---|---|---|
| JP | 56-37179 | * | 8/1981 | 65/532 |
| JP | 6-183771 | * | 7/1994 | 65/414 |

\* cited by examiner

*Primary Examiner*—John Hoffman
(74) *Attorney, Agent, or Firm*—Hogan & Hartson, L.L.P.

(57) ABSTRACT

A method and apparatus for producing a glass base material for an optical fiber. A material for an optical fiber and a reaction gas are jetted from a burner connected to a material line and a gas line toward a surface of a quartz substrate, in order to deposit a soot-like reaction product on the substrate at a predetermined position to thereby produce a glass base material for an optical fiber. Dry air is introduced into a reaction container in an amount of 4 to 8 times the amount of water vapor that is generated due to flame hydrolysis during the reaction. Therefore, it is possible to reliably solve the problem that the interior of the reaction container is excessively dried, with the result that soot generated through a reaction adheres to and aggregates on the wall surface of the reaction container due to static electricity, and the problem that the amount of water vapor becomes excessive and is condensed on the wall surface, with the result that soot strongly adheres to the wall surface, while the observation window or the like becomes fogged. Further, soot peeled off the wall surface is prevented from adhering to or melting into the side surface or base portion of a pre-form being pulled, so that the quality of products is improved, and stable operation becomes possible.

1 Claim, 1 Drawing Sheet

METHOD OF DEPOSITING GLASS SOOT
WITH CONTROLLING REACTION
CHAMBER HUMIDITY TO PREVENT
ACCUMULATION OF EXCESS SOOT

BACKGROUND OF THE INVENTION

1. Field of the Invention

The present invention relates to a method and apparatus for producing a glass base material for an optical fiber, and more particularly to a technique for solving the problems involved in production of a glass base material (pre-form) for an optical fiber; namely, the problem that when the interior of a reaction container becomes excessively dry, soot produced through a reaction adheres to a wall surface of the reaction container by action of static electricity and agglomerates thereon, and the problem that when the interior of the reaction container becomes excessively humid, water vapor condenses on the wall surface of the reaction container, with the result that soot adheres to the wall surface and an observation window becomes fogged.

2. Description of the Related Art

If an attempt is made to produce a very thin optical fiber in a single step, control for realizing an optimal refractive index distribution becomes difficult. Therefore, in a conventional optical fiber production process, a glass base material (pre-form) having the same refractive index as the final product but having a larger diameter is first produced, and the glass base material is heated and drawn while the diameter of a drawn fiber is controlled to be constant. Thus, a very thin optical fiber is produced.

Such a glass base material has been produced in accordance with various methods, such as a VAD (vapor phase axial deposition) method and CVD (chemical vapor phase deposition) methods. In the VAD method, a material such as silicon tetrachloride ($SiCl_4$) or germanium tetrachloride ($GeCl_4$), together with $H_2$ gas and $O_2$ gas, is jetted from an oxyhydrogen burner toward the lower end of a rotating quartz substrate, while a flame hydrolysis reaction is caused by the oxyhydrogen burner, so that soot-like reaction product ($SiO_2$) is axially deposited on the lower end of the quartz substrate. The rotating quartz substrate is pulled upward in order to produce a glass base material.

CVD methods are categorized into an inside deposition CVD method in which a reaction product is deposited on the inner circumferential surface of a quartz tube, which is then crushed, and an outside deposition CVD method in which a reaction product is radially deposited on the outer circumferetial surface of a quartz rod, and the deposited reaction product is crushed after removal of the quartz rod. As in the case of the above-described VAD method, in the outside deposition CVD method, a material such as silicon tetrachloride ($SiCl_4$) or germanium tetrachloride ($GeCl_4$) together with $H_2$ gas and $O_2$ gas, is jetted from an oxyhydrogen burner toward the quartz rod.

Further, in the case of the VAD method and the outside deposition method, a material line for feeding a material such as silicon tetrachloride ($SiCl_4$) or germanium tetrachloride ($GeCl_4$) and gas lines for feeding $H_2$ and $O_2$ are connected to a burner whose tip is located inside the reaction container, thereby enabling production of a glass base material.

In the above-described apparatus for producing a glass base material for an optical fiber, water vapor generated within the reaction container due to oxyhydrogen flame hydrolysis reaction condenses on the inner wall surface of the reaction container, with the result that, in the case of the VAD method, many water droplets are condensed on glass surfaces of an observation window and other control window, as well as on the base portion of a quartz substrate, which is located outside of a path (flame flow region) which connects the burner, a target portion, and an evacuation pipe and through which reaction gas mainly flows. Further, a portion of soot that has failed to adhere to the target portion strays and loses velocity, so that it comes to adhere to the inner wall surface of the reaction container. If water droplets exist on the inner wall surface, the soot first adheres to the wall in a sticky state, and when dried, forms a film strongly adhering to the wall surface. Further, if the film of soot peels off the wall surface and adheres to the side surface or base portion of the quartz substrate or melts into the target portion, the soot becomes foreign matter, resulting in degraded quality.

In order to prevent condensation of water vapor and adhesion of soot to wall surface to thereby solve the above-described problem, conventionally air has been introduced into the reaction container or jetted toward the wall surface. However, the amount of introduced air and the manner of introducing air have been determined empirically; therefore, when the size of the apparatus and production conditions are changed, the position of introduction of air and the amount of introduced air become improper. If the amount of introduced air becomes excessive, the interior of the reaction container is excessively dried, resulting in generation of static electricity. In such a case, a large amount of charged soot adheres to the wall surface and disturbs the flow of gas, with the result that control of reaction may become difficult. Further, there arise other problems such as generation of spark at the time of cleaning the interior of the reaction container after production.

If the amount of introduced air becomes excessively small, water vapor and water droplets become difficult to discharge from the reaction container, thereby causing various problems, such as the problem that water droplets accumulate within a pressure tap of the reaction container provided for internal-pressure measurement, thereby making impossible accurate measurement of the internal pressure, and the problem that water droplets and soot come into contact with and adhere strongly to an observation window or other control window, thereby making the removal of soot difficult.

SUMMARY OF THE INVENTION

In view of the foregoing, an object of the invention is to provide a method and apparatus for producing a glass base material for an optical fiber, in which the amount of air is not determined empirically, and which therefore can reliably solve problems involved in production of a glass base material (pre-form) for an optical fiber, i.e., the problem that the interior of the reaction container is excessively dried, with the result that soot generated through a reaction adheres to and aggregates on the wall surface of the reaction container due to static electricity, and the problem that the amount of water vapor becomes excessive and is condensed on the wall surface, with the result that soot strongly adheres to the wall surface, while the observation window or the like becomes fogged.

Another object of the present invention is to provide a method and apparatus for producing a glass base material for an optical fiber, which prevent soot peeled off the wall surface from adhering to or melting into the side surface or base portion of a pre-form being pulled, thereby improving the quality of products, while enabling stable operation.

In order to achieve the above-described object, the present invention provides a method for producing a glass base material for an optical fiber, in which a material for an optical fiber and a reaction gas are jetted from a burner which is connected to a material line and a gas line toward a surface of a quartz substrate, in order to deposit a soot-like reaction product on the substrate at a predetermined position to thereby produce a glass base material for an optical fiber, characterized in that dry air is introduced into a reaction container in an amount of 2 to 30 times the amount of water vapor that is generated from the burner due to flame hydrolysis during the reaction.

When dry air in an amount of 2 to 30 times that (as reduced to NTP) of water vapor generated from the burner due to flame hydrolysis is introduced into the reaction container from the base portion of the quartz substrate, an observation window, or other control window and at a line velocity that does not disturb flame flow, a proper degree of humidity is maintained in the vicinity of the wall surface and in dead regions outside the flame flow region within the reaction container, and dry air flows at a proper velocity. Accordingly, there does not occur the problem that soot strays and adheres to the side surface of the quartz substrate and dirties the observation window and the like while water vapor condenses on the windows, so that a contamination-free base material for an optical fiber can be produced. Further, since no water vapor condenses on the control widow, proper measurement becomes possible, and thus a controller is prevented from causing erroneous operation, so that stable operation is realized. Moreover, the humidity is maintained at a proper level, adhesion of dry dust to the wall surface due to static electricity decreases, and there can be eliminated the possibility that spark is generated during cleaning work performed when the operation is stopped, so that highly safe operation becomes possible.

The present invention also provides an apparatus for producing a glass base material for an optical fiber, wherein a material for an optical fiber and a reaction gas are jetted from a burner which is connected to a material line and a gas line toward a surface of a quartz substrate, in order to deposit a soot-like reaction product on the substrate at a predetermined position to thereby produce a glass base material for an optical fiber, characterized in that the apparatus is constructed to introduce dry air into a reaction container in an amount of 2 to 30 times that of water vapor that is generated due to flame hydrolysis during the reaction.

Since the apparatus of the present invention can introduce air in an amount of 2 to 30 times that of water vapor generated due to flame hydrolysis, the above-described problems such as bedewing can be prevented.

Preferably, the dry air is introduced into the reaction container from at least the base portion of the quartz substrate and the observation window of the reaction container.

In this case, a pipe for introducing dry air is provided such that dry air is introduced into the interior of the reaction container from regions outside the flame flow region in which flame flow exiting the burner hits the target portion and then reaches the evacuation port; i.e., from the base portion of the quartz substrate located in a dead region in which the flame flow hardly flows, and from a position around the observation window or other control window attached to a branched pipe in which the temperature is low and gas is likely to stagnate. Therefore, no dead region is formed, thereby preventing the soot from straying and adhering to the side surface of the quartz substrate and dirtying the window, while preventing water vapor from condensing on the window.

In the present invention, from a proper position on the reaction container, air is continuously introduced in an amount of 2 to 30 times that of water vapor generated due to flame hydrolysis. Therefore, soot neither adheres to nor melts into a product pre-form being pulled, and adhesion of soot to the window glass and condensation of water vapor are mostly eliminated, so that the quality of the product pre-form is improved and the operation is stabilized. Further, since generation of static electricity is mitigated and therefore the amount of soot adhering to the wall surface due to charge of the soot decreases, there is prevented generation of spark at the time of cleaning the interior of the reaction container while the operation is stopped, so that the production can be performed in a highly safe manner.

DESCRIPTION OF THE PREFERRED EMBODIMENT

Figure 1:
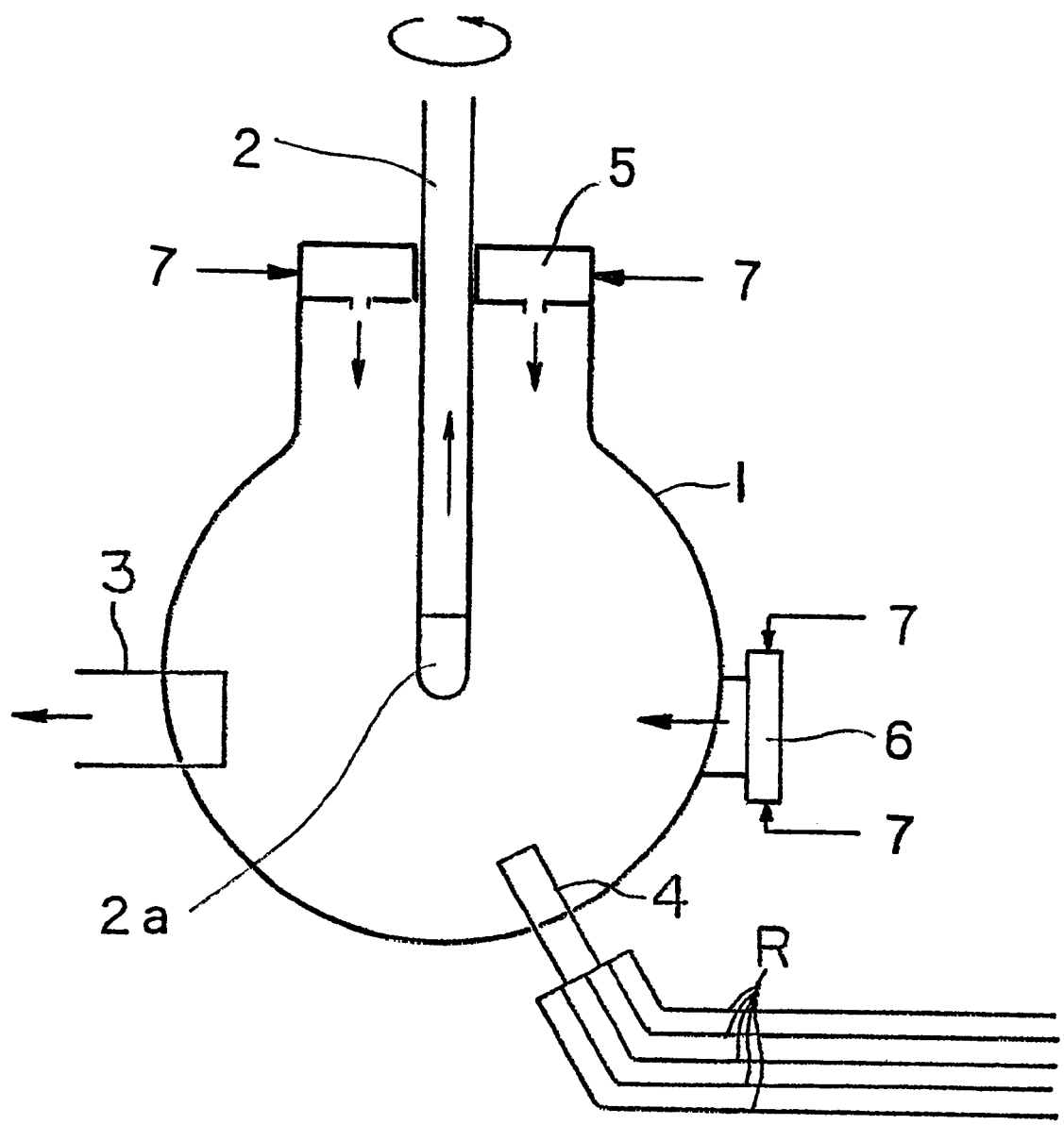
FIG. 1 is a schematic view showing the structure of a production apparatus according to an embodiment of the present invention in which a dry air introduction pipe is provided in order to introduce air into a reaction container.

An embodiment of the present invention will now be described with reference to the accompanying drawings, but the present invention is not limited thereto.

The apparatus for producing a glass base material for an optical fiber according to the present invention can be applied to, for example, an apparatus for producing a glass base material (pre-form) in accordance with the VAD (vapor-phase axial deposition) method. As shown in FIG. 1, the apparatus includes a reaction container 1 into which a quartz bar 2 serving as a substrate is inserted, an evacuation pipe 3 for creating vacuum within the reaction container 1, and a burner 4 disposed such that its tip end is directed to a target portion 2a at the lower end of the quartz bar 2. To the burner 4 are connected material lines for feeding silicon tetrachloride ($SiCl_4$) serving as a material of an optical fiber and germanium tetrachloride ($GeCl_4$) serving as a dopant for controlling the index of refraction, as well as gas lines for feeding $H_2$ gas and $O_2$ gas (material and gas lines R).

In the present embodiment, a dry air introduction pipe 7 is connected to an annular introduction port 5, so that air is introduced in to the interior of the reaction container 1 from the annular introduction port 5 and the air hits the inner surface of the glass of an observation window 6. Further, when a control window (unillustrated) is provided, the dry air introduction pipe 7 is connected to the reaction container 1 such that air hits the inner surface of the glass of the control window as in the case of the observation window.

In the above-descried apparatus, a glass base material for an optical fiber is produced as follows. While the quartz bar 2 is rotated, the material and the gases are jetted from the burner 4 toward the target portion 2a to cause a flame hydrolysis reaction, so that a soot-like reaction product ($SiO_2$) is axially deposited on the surface of the target portion 2a. The rotating quartz bar 2 is pulled upward in order to produce a glass base material.

When the glass base material for an optical fiber is produced in accordance with the VAD method, flame forms a flame flow region that extends from the tip end of the burner 4 and reaches the evacuation pipe 3 via the target portion 2a. The soot-like reaction product is carried by the flame flow and hits the target portion 2a. Although the soot mostly accumulates on the target portion 2a, a fraction of the soot leaves the flame flow region and is carried by a turbulent flow to the container wall surface, as well as to the base portion and side surface of the quartz bar 2, which are dead regions with respect to the flame flow, so that soot stalls there and adheres to and accumulates on the wall surface and the base portion and side surface of the quartz bar 2.

Moisture generated due to the flame hydrolysis reaction is mostly discharged in the form of water vapor together with the flame flow. However, a fraction of the moisture is carried by the turbulent flow and behaves in the same manner as the above-described soot, so that water vapor condenses on the wall surface or the glass surface of the observation window, whose temperatures are low. At this time, the water vapor may adhere to the wall surface and the glass surface after soot is incorporated therein.

Soot that has failed to hit the target portion 2a, has left the flame flow region, or has failed to be discharged from the evacuation port acts as an impurity or foreign matter for the pre-form which is processed into a final product. Accordingly, such soot should not be allowed to adhere to or melt in to the pre-form being pulled.

In order to prevent condensation of water vapor and adhesion of soot to wall surface, conventionally air has been introduced into the reaction container or jetted toward the wall surface. However, the amount of introduced air and the manner of introducing air have been determined empirically; therefore, when the size of the apparatus and production conditions are changed, the position of introduction of air and the amount of introduced air become improper. If the amount of introduced air becomes excessive, the interior of the reaction container is excessively dried, resulting in generation of static electricity. In such a case, a large amount of charged soot adheres to the wall surface and disturbs the flow of gas, with the result that control of reaction may become difficult. Further, there arise other problems such as generation of spark at the time of cleaning the interior of the reaction container after production.

If the amount of introduced air becomes excessively small, water vapor and water droplets become difficult to discharge from the reaction container, thereby causing various problems, such as the problem that water droplets accumulate within a pressure tap of the reaction container provided for measurement of the inner pressure, thereby making impossible accurate measurement of the internal pressure, and the problem that water droplets and soot come into contact with and adhere strongly to an observation window or other control window, thereby making the removal of soot difficult.

In order to solve the above-described problem, the inventors of the present invention determined the amount of dry air to be introduced and the manner for introducing the dry air such that soot, water vapor, and moisture that have entered dead regions outside the flame flow region or that stagnate along the wall surface are reliably driven out, and the production of a glass base material can be performed while water vapor is discharged such that proper amounts of water vapor and moisture are caused to remain in order to prevent the interior of the reaction container from being excessively dried and to prevent the amounts of water vapor and moisture from becoming excessive. That is, in the structure shown in FIG. 1, the dry air introduction pipe 7 is connected to the annular introduction port 5 disposed at the base portion of the quartz bar 2 such that air flows from the base portion of the quartz bar 2 toward the target portion 2a at the tip end of the quartz bar 2. Further, the dry air introduction pipe 7 is provided such that dry air hits the inner surface of the glass of the observation window 6. When a control window (unillustrated) exists, piping similar to that for the observation window may be provided for the control window in order to enhance the effect of the present invention.

Dry air is introduced into the reaction container in an amount of 2 to 30 times, more preferably 4 to 8 times, that (as reduced to NTP) of water vapor generated due to flame hydrolysis. An amount less than 2 times that of water vapor generated due to flame hydrolysis is excessively small, and soot or moisture stagnates and becomes likely to adhere to the wall surface or to condense thereon. An amount greater than 30 times that of water vapor generated due to flame hydrolysis is excessive, and the interior of the container is brought into an excessively dried state, so that a larger amount of floating soot is likely to adhere to the wall surface due to static electricity.

The above-described flame hydrolysis reaction is expressed by the following chemical equation, and, as is evident from the chemical equation, two moles of water vapor is generated for every mole of the material silicon tetrachloride ($SiCl_4$).

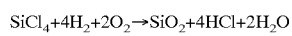

$$SiCl_4+4H_2+2O_2 \rightarrow SiO_2+4HCl+2H_2O$$

For example, when $SiCl_4$ is burned at a rate of 1 mol (170 g)/min, water vapor is theoretically generated at a rate of 44.8 liters/min (as reduced to NTP). Accordingly, dry air is introduced into the reaction container at a rate of 90–1344 liters/min (as reduced to NTP), which is 2 to 30 times that of the generated water vapor.

The dry air introduced into the reaction container preferably has a relative humidity RH of about 30–70%. If the relative humidity RH is less than 30%, the interior of the reaction container is excessively dried. If the relative humidity RH exceeds 70%, condensation of water vapor occurs easily. Therefore, relative humidity outside the above-described range is not preferred.

EXAMPLE

The present invention will next be described by way of example.

Example

Through use of the apparatus shown in FIG. 1, an experiment was performed seven times while the amount of supply of the material gas was maintained constant but the amount of introduced dry air was changed. The conditions and the results of the experiment are shown in Table 1.

In the fourth experiment, an optical fiber base material was produced while hydrogen (30 l/min), oxygen (20 l/min), and $SiCl_4$ (38 ml/min) were fed through use of a quintuple pipe burner having an outer diameter of 35 mm. At this time, dry air (relative humidity: 50%) was introduced into the reaction container from the upper portion thereof (from the base portion of the quartz bar) at a rate of 100 l/min and from an observation window at 20 l/min, so that dry air was introduced at a rate of 120 l/min in total (about 8 times that of the generated moisture). As a result, no water droplets adhered onto the inner wall surface, the observation window, the control window, the pressure tap, and the like. Further, soot did not adhere to the inner wall surface of the reaction container in a large amount, and when the reaction container was cleaned no spark was generated due to static electricity.

In the first experiment, the flow rate of dry air (relative humidity: 50%) introduced from the base portion of the quartz bar was set at a relatively low rate of 15 l/min, which is substantially equal to that of the generated water vapor. As a result, from the midpoint of the production, water droplets were formed, so that accurate measurement of the internal pressure of the reaction container became impossible. In the seventh experiment, dry air (relative humidity: 50%) was introduced into the reaction container from the upper portion thereof (from the base portion of the quartz bar) at a rate of 480 l/min and from an observation window at 20 l/min, so that dry air was introduced at a rate of 500 l/min in total. As a result, the flame jetted from the burner became turbulent, resulting in a decrease in the ratio of generated quartz particles to quartz particles reaching the target, and the production of the base material became impossible after the midpoint.

The results of the above-described repeated experiment revealed that an effective result is obtained if dry air is introduced into the reaction container in an amount of 2 to 30 times, particularly 4 to 8 times, that of water vapor generated due to reaction.

TABLE 1

| Experiment | Dry air introduction rate (l/min) | Rate normalized with respect to rate of water vapor generation | Results Observation window | Adhesion and agglomeration of soot on wall surface |
|---|---|---|---|---|
| 1st | 15 | 1 | Dew formed | Small amount |
| 2nd | 30 | 2 | No dew formed | Small amount |
| 3rd | 60 | 4 | No dew formed | Trace amount |
| 4th | 120 | 8 | No dew formed | Trace amount |
| 5th | 300 | 20 | No dew formed | Small amount |
| 6th | 450 | 30 | No dew formed | Small amount |
| 7th | 500 | 33.3 | No dew formed | Large amount |

The present invention is not limited to the above-described embodiments. The above-described embodiments are mere examples, and those having the substantially same structure as that described in the appended claims and providing the similar action and effects are included in the scope of the present invention.

For example, in the above-described embodiment of the present invention, effectiveness of introduction of dry air has been described for the case of the VAD method in which a reaction product is deposited on the lower end of a quartz substrate. However, the present invention is not limited thereto, and can be applied to cases where a reaction product is deposited on the circumference of a quartz substrate as in the case of the outside deposition CVD method.

Further, in the above-described embodiment, a description has focussed on the example in which dry air is introduced into the reaction container from the base portion of the quartz substrate and from the observation window. However, the present invention is not limited to such an example, and encompasses other modified examples insofar as dry air is introduced into the reaction container in an amount of 2 to 30 times that of water vapor generated due to reaction.

What is claimed is:

1. A method for producing a glass base material for an optical fiber, comprising the steps of:

placing a quartz substrate in a reaction container;

jetting a material for an optical fiber and a reaction gas from a burner connected to a material line and a gas line toward a surface of the quartz substrate in order to deposit a soot-like reaction product on the substrate to thereby produce a glass base material for an optical fiber; and introducing air having a relative humidity RH of 30 to 70% into a reaction container from both a holding portion of a quartz substrate and observation window portion of a reaction container at a supply rate of 4 to 8 times versus a generation rate of water vapor that is generated from the burner due to flame hydrolysis during reaction.

* * * * *